United States Patent [19]
Chen et al.

[11] Patent Number: 5,564,085
[45] Date of Patent: Oct. 8, 1996

[54] CELLULAR TELEPHONE RF RADIATION AMELIORATING DEVICE

[76] Inventors: Jinyuan Chen, 2225 S. Bountiful Blvd., Bountiful, Utah 84010; Ding Wu, 975 E. 400 South, Apt. 12, Salt Lake City, Utah 84102

[21] Appl. No.: 298,420

[22] Filed: Aug. 30, 1994

[51] Int. Cl.⁶ .............................. H04B 1/38; H04Q 7/32
[52] U.S. Cl. ........................... 455/117; 455/90; 455/128; 379/59
[58] Field of Search .................... 455/89, 90, 117, 455/128, 129; 379/59, 437, 447, 450

[56] References Cited

U.S. PATENT DOCUMENTS

| | | | |
|---|---|---|---|
| 4,823,384 | 4/1989 | Lindsay | 379/450 |
| 4,864,611 | 9/1989 | Helmuth | 379/450 |
| 4,905,276 | 2/1990 | Catey et al. | 379/450 |
| 5,123,044 | 6/1992 | Tate | 455/90 |
| 5,335,366 | 8/1994 | Daniels | 455/90 |

FOREIGN PATENT DOCUMENTS 2-54631  2/1990  Japan ...................... 455/90

*Primary Examiner*—Chi H. Pham
*Attorney, Agent, or Firm*—Thorpe, North and Western

[57] ABSTRACT

A device for ameliorating RF radiation received from cellular telephones and the like is disclosed. The device includes at least one spacing member attachable to the cellular telephone so as to maintain the telephone a minimum desired distance from the user while the telephone is in use. The spacer will generally be made of an elastomeric and/or energy absorbing material, so as to be comfortable and minimize the specific energy absorption rate of RF radiation by the user.

6 Claims, 4 Drawing Sheets

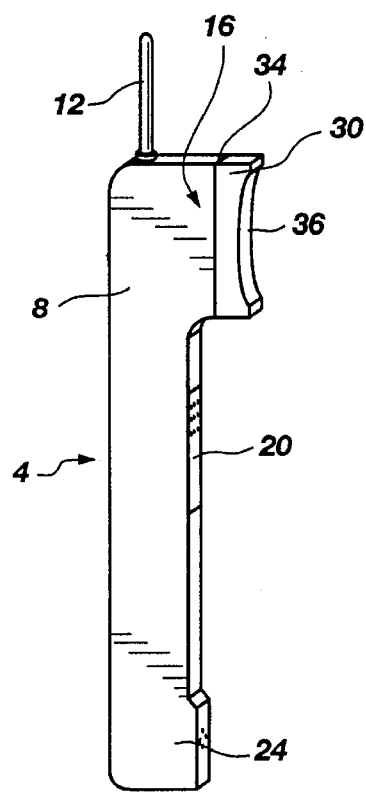 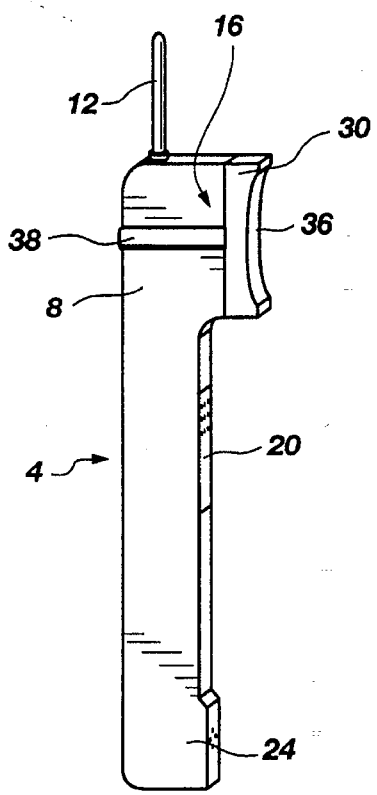 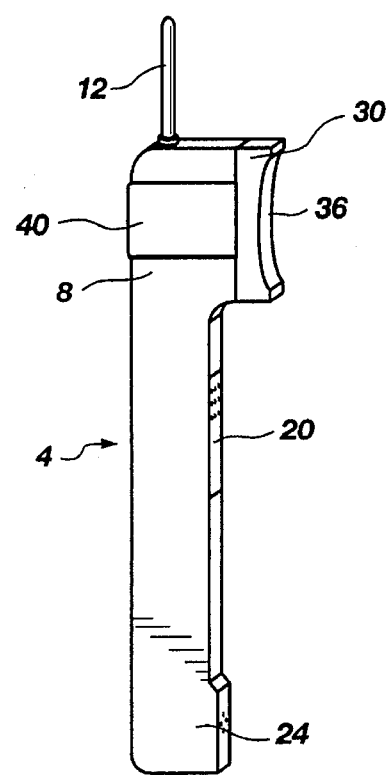
Fig. 1         Fig. 1A         Fig. 1B
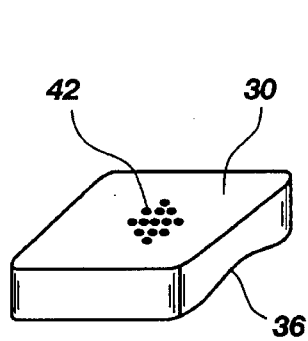 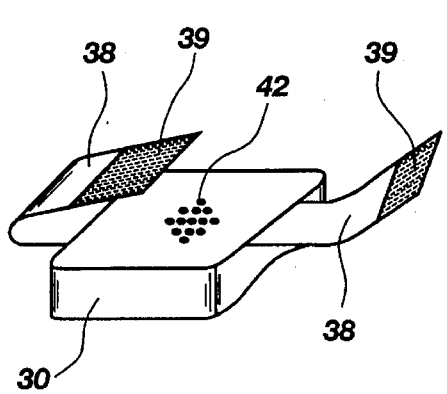 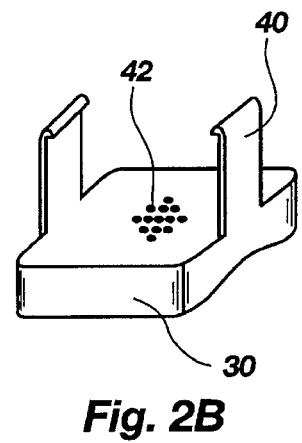
Fig. 2         Fig. 2A         Fig. 2B

CELLULAR TELEPHONE RF RADIATION AMELIORATING DEVICE

BACKGROUND OF THE INVENTION

The present invention relates to a device for ameliorating RF radiation, and in particular to such a device which is attachable to a cellular telephone so as to minimize the absorption of RF radiation by persons using the telephone. The term "ameliorating" is used herein to mean "reducing".

Recently, there has been considerable concern that the use of mobile communication devices may cause health problems in those persons using the devices. In particular, there has been concern that the widespread use of cellular telephones may stimulate the growth of tumors in areas of the human brain which are in the proximity of the cellular telephone's antenna. C. M. Fischetti, "The Cellular Phone Scare" IEEE spectrum, June 1993, pages 43–47. Scientists and others believe that the radiation emitted by the cellular phones may eventually cause significant health risks as the use of cellular phones becomes more and more common. In particular, there is concern that when the telephone is placed close to the head, power deposition from the transceiver and antenna may cause thermal insult on the brain and other organs of the head. Power deposition is typically quantified by the specific energy absorption rate, commonly referred to as SAR.

In light of these concerns, the governments of several countries have implemented restrictions on exposure to high frequency electromagnetic fields in terms of localized SAR. See IEEE C95.1, 1991, IEEE Standard for Safety Levels with Respect to Human Exposure to Radio Frequency Electromagnetic Fields, and Mckinley et al., Restrictions on Human Exposure to Static and Time Varying Electromagnetic fields and Radiation, Documents of the National Radiological Protection Board, 4 (1993). These concerns are especially heightened in view of proposals being considered in a number of countries to raise the frequencies at which cellular phones may communicate. Higher frequencies are considered to pose even a greater threat.

While these restrictions place maximum limits on SAR, there is currently insufficient knowledge about the effect of low levels of RF radiation to determine whether long-term, low-level exposure can be harmful. Thus, several antenna shields have been developed for further reducing the amount of RF radiation received by the user. Typically, such shields extend from the cellular phone in a manner so as to be generally parallel with the antenna and positioned between the antenna and the head of the user. While such shields do reduce the amount of RF radiation received by the user, they have several problems. First, the shields are generally non-collapsible. While most of the new cellular telephones have collapsible antenna, the shield extends several inches from the telephone, even when the telephone is not in use. Thus, the advantage of retracting the antenna is lost and more storage space is needed.

Another disadvantage of the antenna shields is that they significantly reduce the range of the cellular phone. By interfering with the RF radiation emitted by the antenna, the shield causes a loss in range by a factor of 2 to 3 in an urban environment. Furthermore, the shield has a tendency to redirect the RF radiation away from the user and back into the telephone, potentially shortening the life of the telephone.

To alleviate the potential health risks, while not significantly interfering with the telephone's functioning, there is a need for a device which decreases the RF radiation received from cellular telephone, without disturbing the RF radiation emitted from the telephone.

SUMMARY OF THE INVENTION

It is an object of the invention to provide an RF radiation ameliorating device which may be used with cellular phones.

It is another object of the invention to provide an RF radiation ameliorating device which is inexpensive and may be easily attached to the cellular phone.

It is yet another object of the invention to provide an RF radiation ameliorating device which may be used with compactible cellular phones, as well as traditional models.

The above and other objects and advantages of the invention are realized in an RF radiation ameliorating device including a spacing member attachable to a cellular phone so as to rest against a user's head and space the cellular telephone a desired distance away from the user's head. In an illustrative embodiment, the spacing member is generally rectangular and has holes formed in the center thereof so as to fit over the ear piece of a cellular telephone and to rest against the user's ear when the telephone is in use. The spacing member is typically 5 millimeters to 20 millimeters thick, so as to space the telephone a sufficient distance from the user, but not be overly cumbersome.

In alternate embodiments, the spacing member is formed of collapsible pieces, or is designed so as to extend from other portions of the cellular telephone, such as the number pad, and rest against the user's face to keep the users face from coming into contact with the cellular telephone.

BRIEF DESCRIPTION OF THE DRAWINGS

The above and other objects, features and advantages of the invention will become apparent following the detailed description provided in conjunction with the accompanying drawings, in which:

FIG. 1 shows an elevated perspective view of a cellular telephone having an RF radiation ameliorating device attached adjacent to the ear piece of the cellular telephone so as to space the telephone from a user's head;

FIG. 1A shows an elevated perspective view of an RF radiation ameliorating device attached to the ear piece of a cellular telephone by an elastic band;

FIG. 1B shows an elevated perspective view of an RF radiation ameliorating device attached to the ear piece of a cellular telephone by a clip.

FIGS. 2, 2A and 2B show perspective views of the RF radiation ameliorating devices shown in FIGS. 1, 1A and 1B, respectively.

DETAILED DESCRIPTION

Figure 3:
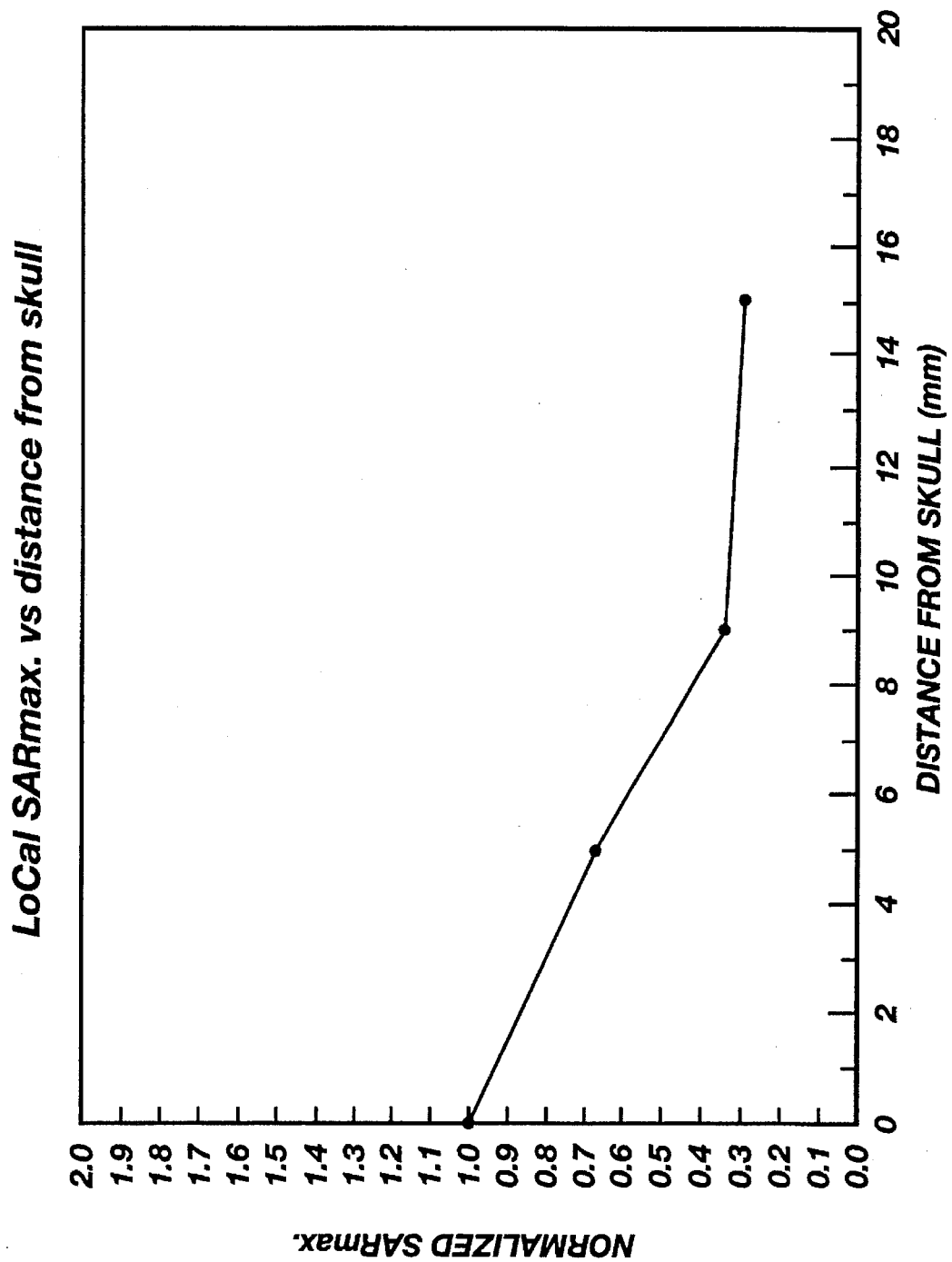
FIG. 3 is a graph of the specific energy absorption rate, SAR, absorbed by a user of a cellular telephone at a defined distance from the telephone.

Reference will now be made to the drawings wherein the different structures comprising the embodiments of the invention shown will be given numeral designations. Referring to FIG. 1, there is shown a cellular telephone, generally indicated at 4. The cellular telephone 4 has a housing 8 for containing a transmitter (not shown) used to communicate with a telephone network. An antenna 12 extends from the top of the housing 8 and is positioned near the ear piece, generally indicated at 16. The housing 8 also contains a number pad 20 for dialing a desired number, and a mouth piece 24 for speaking to another party.

Attached to the housing 8 adjacent to the ear piece 16 is an RF radiation ameliorating device 30 which is used to space the cellular telephone 4 a certain minimum distance from the user. The RF radiation ameliorating device is attached to the cellular telephone 4 by an adhesive material 34 or by some other method which keeps the device 30 securely attached when the telephone is in use. Those skilled in the art will recognize that the device 30 could be removably attached while retaining the advantages of the present invention. In such a situation, the device 30 could be removed when the telephone 4 is not in use as there is no RF radiation being emitted.

The RF radiation ameliorating device 30 is preferentially formed with a concave side 36 which allows the device 30 to be comfortably held to user's ear, or otherwise rested against the user's head. The RF radiation ameliorating device 30 is typically made of an elastomeric or plastic material, such as gum rubber, synthetic rubber, foam plastic or other material so as to be comfortable when rested against the user's ear. The substance comprising the device 30 also could have electromagnetic energy absorbing properties. Obviously, the device 30 could also be made of a combination of substances to absorb energy and to be comfortable when placed against the ear. These substances, in combination with the spacing effect of the device 30, serve to decrease the specific energy absorption rate of the electromagnetic energy as will be explained in more detail with respect to FIG. 3.

In FIG. 1A, there is shown a perspective view of an RF radiation ameliorating device similar to that shown in FIG. 1, and numbered accordingly. The primary difference is that the device 30 in FIG. 1A uses an elastic band 38 to hold the device 30 to the cellular telephone 4 instead of the adhesive material 34 shown in FIG. 1. Likewise, in FIG. 1B, a clip 40 is used to hold the device 30 in place instead of the adhesive material 34 (FIG. 1) or the elastic band 38 (FIG. 1A).

Referring now to FIGS. 2, 2A and 2B, there are shown a perspective view of the RF radiation ameliorating device 30 shown in FIGS. 1, 1A and 1B, respectively. The device 30 has holes 42 formed therein so that the device will not interfere with the user's ability to hear sounds emitted from the ear piece 16 (FIGS. 1, 1A and 1B). The holes 42 also make the RF radiation ameliorating device 30 more comfortable when placed against the user's ear. Obviously, a single hole could be used instead of the group shown at 42.

In FIG. 2A, the band 38 is shown with an attaching mechanism 39, such as the hook and loop fastener—VELCRO. Those skilled in the art will recognize that such a fastener is not necessary if an elastic band 38 is used. FIG. 2B shows clips 40 which are typically made of a plastic material.

FIG. 3 shows a diagram of specific energy absorption rate (local maximum SAR) based on the distance of the source from the skull. As can be seen by the graph, the energy absorbed when the source is 5 millimeters from the skull is only 60 percent of that absorbed when the source is not spaced apart from the skull. By increasing the spacing to 9 millimeters, the specific energy absorption rate is cut to about one-third. Spacing the radiation source 15 mm from the skull cuts the energy absorption to about 30 percent of the original amount. Thus, by spacing the cellular telephone 4 (FIG. 1) from the user, the amount of energy absorbed can be reduced significantly.

When conventionally used, the cellular telephone 4 (FIG. 1) is held so that the ear piece rests against the user's ear and the number pad rests against the user's face. Any radiation emitted by the cellular telephone 4 toward the user is absorbed by the ear, face and surrounding areas of the head. By spacing the telephone 5 millimeters to 20 millimeters from the head, the amount of RF radiation absorbed by the user is significantly decreased without significantly interfering with the use of the telephone. The decrease in radiation, in turn, significantly decreases the risk of negative health implications involved with using a cellular telephone.

Figures 4, 5:
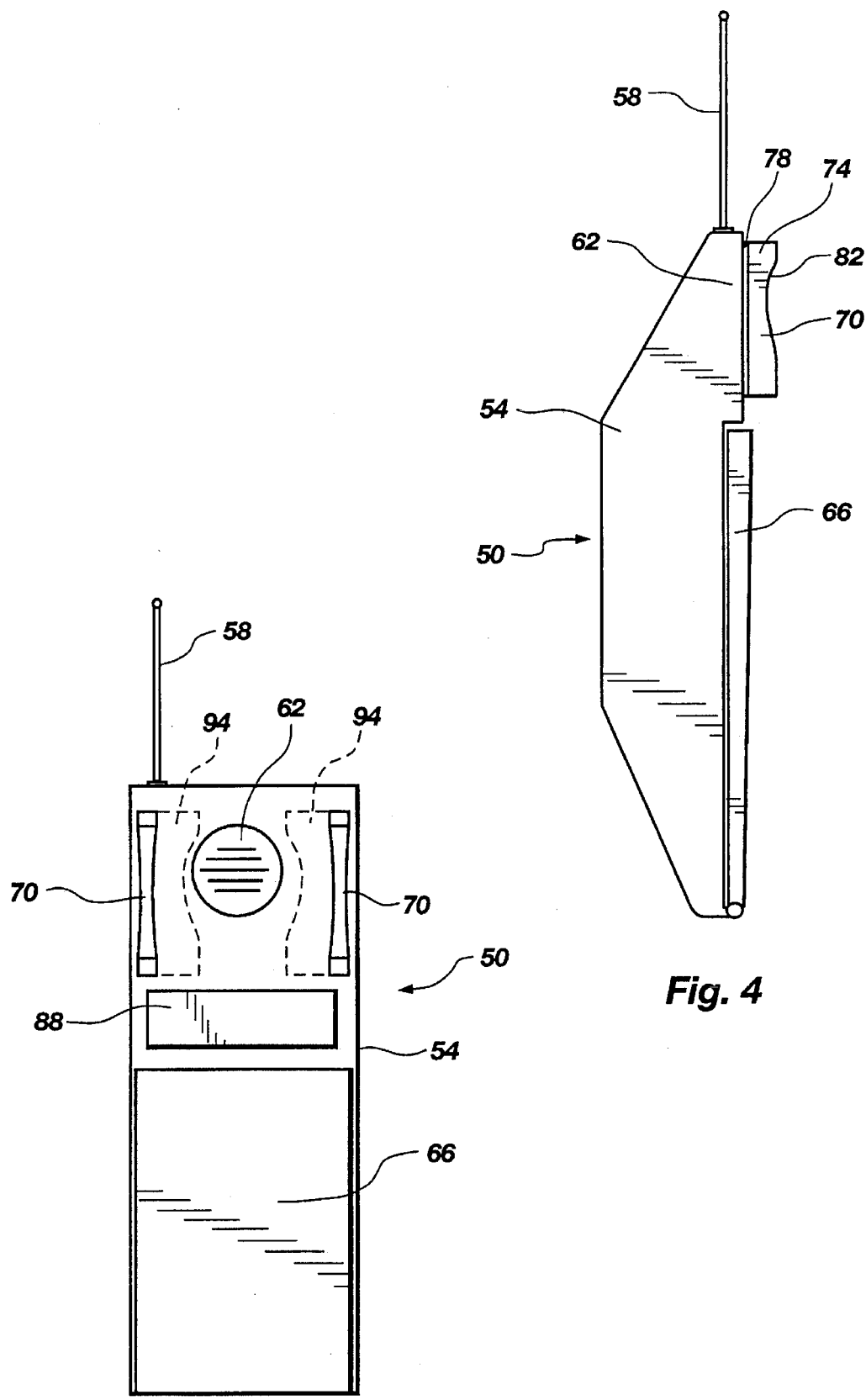
FIG. 4 shows an elevated perspective view of an alternate embodiment of an RF radiation ameliorating device as may be used with collapsible cellular telephones, such as "flip-phones."
FIG. 5 shows a frontal view of the "flip-phone" and RF radiation ameliorating device shown in FIG. 4.

Referring now to FIG. 4, there is shown a cellular telephone, generally indicated at 50. The cellular telephone 50 is a collapsible type generally referred to as a "flip-phone." The purpose of such telephones is to provide a cellular telephone which may be easily compacted so as to fit in a shirt or coat pocket.

The cellular telephone 50 has a base housing 54 which houses the transmitter (not shown) used to communicate with the telephone network, as well as a collapsible antenna 58 and the ear piece 62. The mouth piece 24 is pivotally attached to the base housing 54 so that it may be collapsed adjacent to the base housing when not in use.

Because the primary purpose of the cellular telephone 50 is to be compact, many users may not wish to use the RF radiation ameliorating device 30 shown in FIGS. 1 and 2. Thus, a compactible embodiment of the device is shown at 70 in FIG. 4. The RF radiation ameliorating device 70 includes a pair of spacers 74 which are made of the same materials as the device 30 of FIGS. 1 and 2 (only one of the spacers being shown in FIG. 4). The spacers 74 are attached to the cellular telephone 50 adjacent to the ear piece 62 by hinges 78. Each spacer 74 is contoured, as shown at 82, so as to rest comfortably against the head or ear of the user.

When the cellular telephone 50 is not in use, the spacers 70 can be rotated about the hinges 78 to minimize the space occupied by the telephone 50 and spacers. Depending on how the hinges 78 are mounted, the spacers 74 could be rotated outwardly to as to be adjacent the sides of the base housing 54, or the spacers could be rotated inwardly to partially cover the ear piece 62 when not in use. If, for example, each spacer 74 is only one-eighth of an inch thick, the spacers could be folded adjacent to the telephone with minimum increase in the overall thickness or width of the cellular telephone 50.

Referring now to FIG. 5, there is shown a front view of the cellular telephone 50 shown in FIG. 4. Each part of the cellular telephone 50 is labeled in accordance with the description given in FIG. 4. Additionally, a digital display used by the caller to insure that the proper phone number has been dialed is also shown at 88.

The spacers 74 permit the cellular telephone 50 to be held away from the user, while at the same time causing minimal expansion of the overall space required to store the cellular telephone. A possible collapsed position of the spacers 74 is indicated by the dotted outlines 94. Such positioning would cause little, if any interference with listening to the ear piece 62 if, for some reason, the user was unable to turn the spacers 74 into the proper position when receiving a call. Those skilled in the art will recognize that the spacers 74 could also be removably attached to that they could be removed from the cellular telephone when it is not in use.

Figure 6:
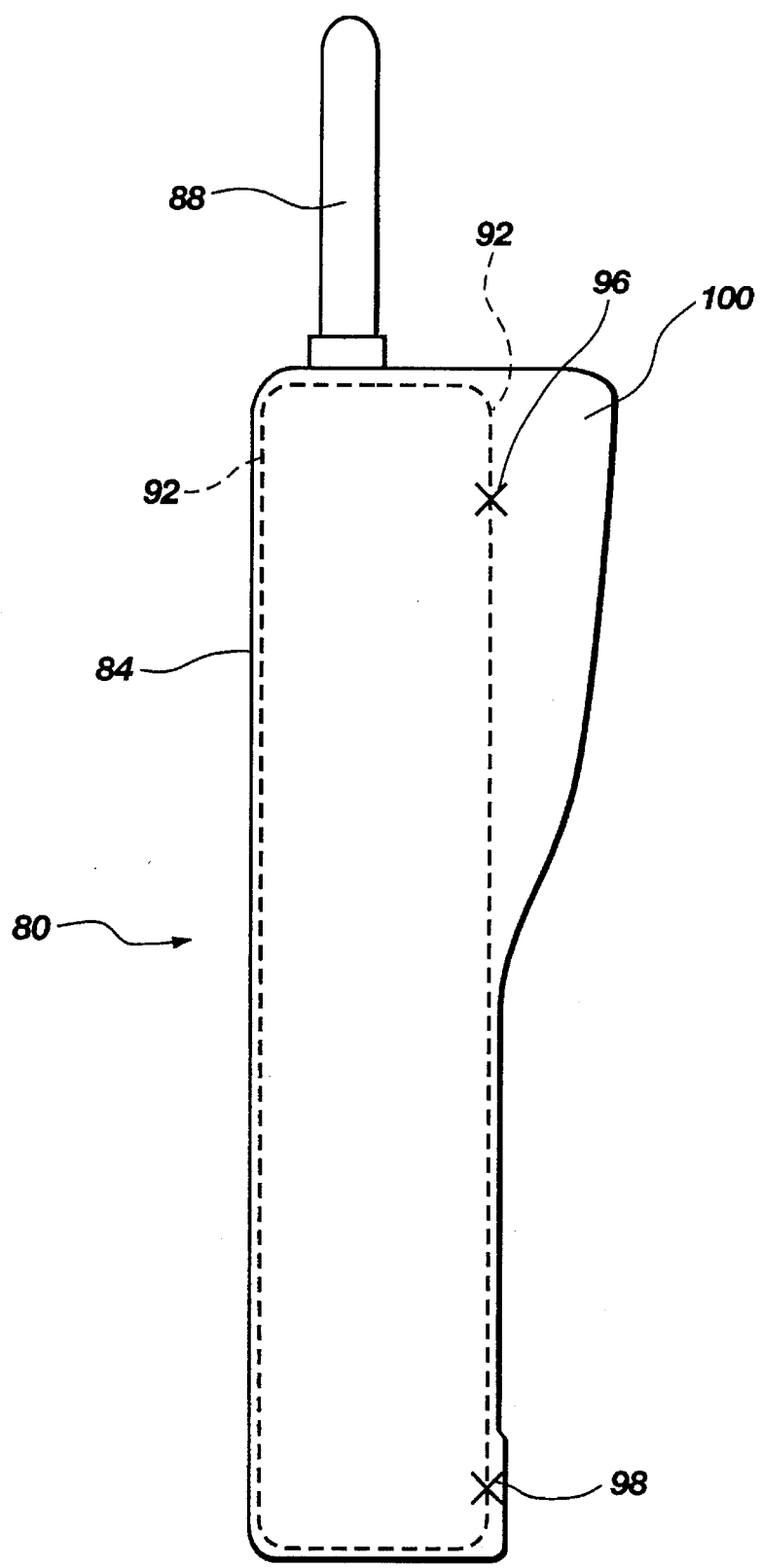
FIG. 6 shows an elevated perspective view of an alternate embodiment of an RF radiation ameliorating device formed integrally with the housing of the telephone.

Referring now to FIG. 6, there is shown yet another embodiment of the present invention. A cellular telephone 80 includes a housing 84 and an antenna 88. The metal frame/shield of the housing 84 is shown by the dotted line 92. The ear piece and mouth piece within the housing 84 may be positioned as is represented by the Xs, indicated at 96 and 98 respectively. At the earpiece 96, the housing 84 has sloped sidewalls 100 which slope outwardly at least 5 millimeters so as to keep the user's ear spaced from the frame/shield of the housing 84. Typically, the sloped sidewalls 100 will extend between 8 millimeters and 20 millimeters to as to allow RF radiation to disperse before contacting the user's ear. Those skilled in the art will recognize that a single sloped sidewall could be used; that the sloped portion could extend from above and/or below the ear piece 96 instead of on lateral sides as shown in FIG. 6; or that some other type of projection could be used to space the user's head from the frame shield.

In the manner described above, there are shown several embodiments of the invention of an RF radiation ameliorating device. The invention serves to ameliorate the effects of cellular telephones with currently used frequencies, as well as those which may use higher frequencies. It will be understood that the above description is of present preferred embodiments, and that other variations and modifications of the RF ameliorating device will be apparent to those skilled in the art without departing from the scope of the invention. For example, rather than placing a spacing device adjacent to the ear piece, the RF radiation ameliorating device could be placed below the ear piece so as to rest on the side of the user's head and keep the telephone spaced from the head of the user. The described RF radiation ameliorating devices are not meant to be a delineation of the scope of the invention, but merely an example of embodiments thereof.

We claim:

1. An RF radiation ameliorating device for use with cellular telephones and other radiation producing devices, the radiation ameliorating device comprising:

spacer means for holding a radiation producing device a predetermined distance from a user's head, said spacer means comprising a pair of spacers, one spacer being disposed on one side of an ear piece of the radiation producing device, and the other spacer being disposed on an opposing side of the ear piece, and attachment means for holding the spacer means to the radiation producing device so as to prevent the radiation producing device from being in contact with the user's head, wherein the attachment means comprises a hinge attached to each spacer and attached to the ear piece so as to enable the spacers to rotate between a position against the radiation producing device and a position extending away from the radiation producing device.

2. The RF radiation ameliorating device for use with cellular telephones of claim 1, wherein each of the spacers comprises a first side adjacent the hinge, and a second side opposite the first side.

3. The RF radiation ameliorating device for use with cellular telephones of claim 2, wherein the second side of each spacer is contoured so as to conform to the shape of a user's head or ear.

4. An RF radiation ameliorating device for use with cellular telephones and other radiation producing devices, wherein the radiation producing device comprises a housing containing at least one radiation producing element therein, said housing including an ear piece having at least one hole formed therein which is disposed in communication with the radiation producing element, the radiation ameliorating device comprising:

spacer means for positioning the radiation producing device a predetermined distance from a user's head, and removably attachable attachment means for holding the spacer means against the ear piece of the housing such that said spacer means surrounds the at least one hole formed in the ear piece and extends outwardly from said hole, such that the spacer means resides sandwiched between the user's head and the at least one hole in the ear piece which is disposed in communication with the radiation producing element when said spacer means is placed against the user's head during use to thereby separate the user's head a predetermined distance from said at least one hole and prevent the radiation producing device from being in contact with the user's head, the attachment means comprising an elastic band.

5. An RF radiation ameliorating device for use with cellular telephones and other radiation producing devices, wherein the radiation producing device comprises a housing containing at least one radiation producing element therein, said housing including an ear piece having at least one hole formed therein which is disposed in communication with the radiation producing element, the radiation ameliorating device comprising:

spacer means for positioning the radiation producing device a predetermined distance from a user's head, and removably attachable attachment means for holding the spacer means against the ear piece of the housing such that said spacer means surrounds the at least one hole formed in the ear piece and extends outwardly from said hole, such that the spacer means resides sandwiched between the user's head and the at least one hole in the ear piece which is disposed in communication with the radiation producing element when said spacer means is placed against the user's head during use to thereby separate the user's head a predetermined distance from said at least one hole and prevent the radiation producing device from being in contact with the user's head, the attachment means comprising a clip means.

6. An RF radiation ameliorating device for use with cellular telephones and other radiation producing devices, wherein the radiation producing device comprises a housing containing at least one radiation producing element therein, said housing including an ear piece having at least one hole formed therein which is disposed in communication with the radiation producing element, the radiation ameliorating device comprising:

spacer means for positioning the radiation producing device a predetermined distance from a user's head, and removably attachable attachment means for holding the spacer means against the ear piece of the housing such that said spacer means surrounds the at least one hole formed in the ear piece and extends outwardly from said hole, such that the spacer means resides sandwiched between the user's head and the at least one hole in the ear piece which is disposed in communication with the radiation producing element when said spacer means is placed against the user's head during use to thereby separate the user's head a predetermined distance from said at least one hole and prevent the radiation producing device from being in contact with the user's head, the attachment means comprising a hinge.

\* \* \* \* \*